United States Patent
Butcher (10) Patent No.: US 7,647,489 B2
(45) Date of Patent: Jan. 12, 2010

(54) FUNCTION CALLING MECHANISM WITH EMBEDDED INDEX FOR A HANDLER PROGRAM AND AN EMBEDDED IMMEDIATE VALUE FOR PASSING A PARAMETER

(75) Inventor: David John Butcher, Kings Lynn (GB)

(73) Assignee: ARM Limited, Cambridge (GB)

( * ) Notice: Subject to any disclaimer, the term of this patent is extended or adjusted under 35 U.S.C. 154(b) by 239 days.

(21) Appl. No.: 11/078,446

(22) Filed: Mar. 14, 2005

(65) Prior Publication Data

US 2005/0210226 A1    Sep. 22, 2005

(30) Foreign Application Priority Data

Mar. 18, 2004   (GB) ................. 0406157.8

(51) Int. Cl.
 *G06F 9/00* (2006.01)
(52) U.S. Cl. ............... 712/242; 712/233; 712/208; 712/211
(58) Field of Classification Search ........ 712/242, 712/208, 211, 233, 24
See application file for complete search history.

(56) References Cited

U.S. PATENT DOCUMENTS

| | | | |
|---|---|---|---|
| 3,889,243 A | 6/1975 | Drimak | |
| 4,236,204 A | 11/1980 | Groves | |
| 4,587,632 A | 5/1986 | Ditzel | |
| 4,862,351 A * | 8/1989 | Green et al. ............. | 712/242 |
| 4,922,414 A | 5/1990 | Holloway et al. | |
| 4,969,091 A | 11/1990 | Muller | |
| 5,136,696 A | 8/1992 | Beckwith et al. | |
| 5,222,221 A * | 6/1993 | Houri et al. .............. | 718/106 |
| 5,249,280 A * | 9/1993 | Nash et al. .............. | 711/5 |
| 5,406,644 A * | 4/1995 | MacGregor .............. | 703/23 |
| 5,448,705 A | 9/1995 | Nguyen et al. ........... | 395/375 |
| 5,455,775 A | 10/1995 | Huber et al. | |
| 5,517,651 A * | 5/1996 | Huck et al. .............. | 712/229 |
| 5,619,665 A | 4/1997 | Emma | |
| 5,638,525 A | 6/1997 | Hammond et al. | |
| 5,659,703 A | 8/1997 | Moore et al. | |
| 5,740,461 A | 4/1998 | Jaggar | |
| 5,742,802 A | 4/1998 | Harter et al. | |
| 5,752,035 A | 5/1998 | Trimberger | |
| 5,784,584 A | 7/1998 | Moore et al. | |
| 5,809,336 A | 9/1998 | Moore et al. | |

(Continued)

OTHER PUBLICATIONS

"Pentium Processor Family Developer's Manual" vol. 3: Archiecture and Programming Manual, 1995.*

(Continued)

*Primary Examiner*—Eddie P Chan
*Assistant Examiner*—Idriss N Alrobaye
(74) *Attorney, Agent, or Firm*—Nixon & Vanderhye P.C.

(57) ABSTRACT

A data processing system 2 is provided which includes an instruction decoder 18 responsive to a handler branch instruction HLB, HBLP which includes an index value field to calculate a handler pointer in dependence upon a handler base address HBA and the index value field and then to branch to that handler pointer position. A handler program 24, 26 at the branch target is then executed following which a return is made to an address following the handler branch instruction using a link address value stored when the handler branch instruction was executed.

52 Claims, 6 Drawing Sheets

U.S. PATENT DOCUMENTS

| | | | |
|---|---|---|---|
| 5,819,063 A * | 10/1998 | Dahl et al. ................... 703/27 |
| 5,838,948 A | 11/1998 | Bunza |
| 5,870,575 A * | 2/1999 | Kahle et al. ................. 712/209 |
| 5,875,336 A | 2/1999 | Dickol et al. |
| 5,892,966 A | 4/1999 | Petrick et al. |
| 5,925,123 A | 7/1999 | Tremblay et al. |
| 5,926,832 A | 7/1999 | Wing et al. |
| 5,937,193 A | 8/1999 | Evoy |
| 5,953,741 A | 9/1999 | Evoy et al. |
| 6,003,126 A | 12/1999 | Huynh et al. |
| 6,009,499 A | 12/1999 | Koppala |
| 6,009,509 A | 12/1999 | Leung et al. |
| 6,014,723 A | 1/2000 | Tremblay et al. |
| 6,021,469 A | 2/2000 | Tremblay et al. |
| 6,026,485 A | 2/2000 | O'Connor et al. |
| 6,029,206 A * | 2/2000 | Endicott et al. ............. 719/315 |
| 6,031,992 A | 2/2000 | Cmelik et al. |
| 6,038,643 A | 3/2000 | Tremblay et al. |
| 6,070,173 A | 5/2000 | Huber et al. |
| 6,088,786 A | 7/2000 | Feierbach et al. |
| 6,122,638 A | 9/2000 | Huber et al. |
| 6,125,439 A | 9/2000 | Tremblay et al. |
| 6,148,391 A | 11/2000 | Petrick |
| 6,298,434 B1 | 10/2001 | Lindwer |
| 6,317,872 B1 | 11/2001 | Gee et al. |
| 6,332,215 B1 | 12/2001 | Patel et al. |
| 6,338,134 B1 | 1/2002 | Leung et al. |
| 6,349,377 B1 | 2/2002 | Lindwer |
| 6,363,522 B1 * | 3/2002 | Click et al. .................. 717/160 |
| 6,374,286 B1 | 4/2002 | Gee et al. |
| 6,484,314 B1 * | 11/2002 | Ishizaki et al. .............. 717/151 |
| 6,606,743 B1 | 8/2003 | Raz et al. |
| 2002/0120434 A1 * | 8/2002 | Crawford et al. ............. 703/26 |
| 2002/0193893 A1 * | 12/2002 | Li et al. ........................ 700/94 |
| 2003/0101326 A1 * | 5/2003 | Fallah et al. ................. 711/204 |
| 2006/0104222 A1 * | 5/2006 | Xu .............................. 370/278 |

OTHER PUBLICATIONS

Computer Systems Design and architecture, Vincent P. Heuring and Harry F. Jordan, 1997. Pertinent pp. 127-129; 132-136; Also with this reference see explanation of JMPL instruction by David McWherter Mar. 8, 2000.*

Free On-Line Dictionary of Computing. FOLDOC. (C)1995-1998. www.foldoc.org search terms: central processing unit; arithmetic and logic unit; control unit; and machine cycle.*

Intel "Pentium Processor Family Developer's Manual", vol. 3: Architecture and Programming Manual. Published: 1995.*

Adar Nir, Grosman Rotem, Instructor: Zion Gal "VAX-11 Assembler & Simulator", Software Laboratory Electrical Engineering Department Technion, Haifa, Israel; Published Aug. 2003; Pertinent pp. 1-26, 31-32, 85-106, 148, 189-194, 248-249.*

David A. Patterson, John L. Hennessy "Computer Architecture A Quantitative Approach" Second Edition 1996, Morgan Kaufmann Publishers, Inc; Pertinent pp. 80-85.*

H. Stone, Chapter 12—"A Pipeline Push-Down Stack Computer", 1969, pp. 235-249.

C. Glossner et al, "Delft-Java Link Translation Buffer", Aug. 1998.

N. Vijaykrishnan et al, "Object-Oriented Architectural Support For a Java Processor" 1998, pp. 330-355.

C. Glossner et al, "The Delft-Java Engine: An Introduction", Aug. 1997.

K. Ebcioglu et al, "A Java ILP Machine Based On Fast Dynamic Compilation", Jan. 1997, pp. 1-13.

A. Wolfe, "First Java-specific chip takes wing" EETimes—1997.

Y. Patt, Introduction to Computer Systems From Bits and Gates to C and Beyond, 1999, pp. 1-517.

M. Ertl, "Stack Caching for Interpreters" 1994, pp. 1-10.

M. Ertl, "Stack Caching for Interpreters" 1995, pp. 1-13.

M. Ertl, "Implementation of Stack-Based Languages on Register Machines" Apr. 1996, pp. 1-4.

J. O'Connor et al, "PicoJava-I: The Java Virtual Machine in Hardware" IEEE Micro A Case for Intelligent RAM, Mar./Apr. 1997, pp. 45-53.

K. Andrews et al, "Migrating a CISC Computer Family Onto RISC Via Object Code Translation" 1992, pp. 213-222.

"PicoJava I Microprocessor Core Architecture" Oct. 1996, pp. 1-8, Sun Microsystems.

M. Ertl, "A New Approach to Forth Native Code Generation" 1992.

M. Maierhofer et al, "Optimizing Stack Code" 1997, p. 19.

D. Ungar et al, "Architecture of SOAR: Smalltalk on a RISC" The 11$^{th}$ Annual International Symposium on Computer Architecture, Jun. 1984, pp. 188-197.

O. Steinbusch, "Designing Hardware to Interpret Virtual Machine Instructions" Feb. 1998, pp. 1-59.

R. Kapoor et al, "Stack Renaming of the Java Virtual Machine" Dec. 1996, pp. 1-17.

A. Yonezawa et al, "Implementing Concurrent Object-Oriented Languages in Multicomputers" Parallel and Distributed Technology (Systems and Applications) May 1993, pp. 49-61.

C. Hsieh et al, "Java Bytecode to Native Code Translation; The Caffeine Prototype and Preliminary Results" IEEE/ACM International Symposium on Microarchitecture, Dec. 1996, pp. 90-97.

Y. Patt et al, Introduction to Computer Systems From Bits and Gates to C and Beyond, 2001, pp. 1-526.

Sun Microsystems PicoJava Processor Core Data Sheet, Dec. 1997, pp. 1-11.

H. McGhan et al, PicoJava A Direct Execution Engine for Java Bytecode, Oct. 1998, pp. 22-26.

C. Glossner et al, "Parallel Processing" Euro-Par 1997: Passau, Germany, Aug. 1997.

Y. Patt, Introduction to Computer Systems From Bits and Gates to C and Beyond, 1999, pp. 10-12 & 79-82.

Espresso—The High Performance Java Core Specification, Oct. 2001, pp. 1-33, Aurora VLSI, Inc.

J. Gosling, "Java Intermediate Bytecodes" 1995, pp. 111-118.

P. Koopman, Jr. "Stack Computers The New Wave" 1989, pp. 1-234.

M. Mrva et al, "A Scalable Architecture for Multi-Threaded JAVA Applications" Design Automation and Test in Europe, Feb. 1998, pp. 868-874.

L. Chang et al, "Stack Operations Folding in Java Processors" IEEE Proc.—Comput. Digit. Tech., vol. 145, No. 5, pp. 333-340 Sep. 1998.

L. Ton et al, Proceedings of the '97 International Conference on Parallel and Distributed Systems, "Instruction Folding in Java Processor", pp. 138-143, Dec. 1997.

K. Buchenrieder et al, "Scalable Processor Architecture for Java With Explicit Thread Support" Electronics Letters vol. 33, No. 18, pp. 1532+, Aug. 1997.

C. Chung et al, Proceedings of the '98 International Conference on Parallel and Distributed Systems, "A Dual Threaded Java Processor for Java Multithreading" pp. 693-700, Dec. 1998.

I. Kazi et al, "Techniques for Obtaining High Performance in Java Programs" Sep. 2000, pp. 213-240.

R. Kieburtz, "A RISC Architecture for Symbolic Computation" 1987, pp. 146-155.

M. Berekovic et al, "Hardware Realization of a Java Virtual Machine for High Performance Multimedia Applications" Signal Processing Systems SIPS 98, pp. 479-488, 1997.

P. Deutsch, "Efficient Implementation of the Smalltalk-80 System" 1983, pp. 297-302.

"Rockwell Produces Java Chip" Sep. 1997, CNET NEWS.COM.

Y. Patt et al, Introduction to Computing Systems from Bits and Gates to C and Beyond, 2001, pp. 1-16, 91-118 & 195-209.

* cited by examiner

| Instruction | HBLP.X # immediate 5, #HandlerID.5 |
|---|---|
| Encoding | 15 14 13 12 11 10  9         5 4          0 |
| | <HBLP opcode> \| #Immediate \| #HandlerID |
| Thumb - 2 Equivalent | MOV r8, # immediate<br>MOV lr , pc<br>ADD pc, HandlerBase, #HandlerID LSL# 5 |
| Definition | R8 = # immediate<br>lr = pc<br>pc = HandlerBase + # HandlerID LSL # 5 |
| Encoding space | 2^11 \| 11 bits |
| Note | This needs to be as efficient as possible, while in Jazelle-X HandlerBase can be treated as read-only. Alternatively the base address used by HandlerBase could be a configuration value picked up on first use pointed to by HandlerBase |
| Note | This instruction will require return stack prediction |
| Instruction | HBL.X # Handler ID. 8 |
| Encoding | 15 14 13 12 11 10 9  8 7         0 |
| | < HBL opcode > \| sbz \| #Handler ID |
| Thumb - 2 Equivalent | MOV lr , pc<br>ADD pc, HandlerBase, #HandlerID LSL# 5 |
| Definition | lr = pc<br>pc = HandlerBase + # HandlerID LSL # 5 |
| Encoding space | 2^8 \| 7 bits |
| Note | This variant exists to so that the number of handlers available can be large enough without reducing the maximum size of immediate in the HBLP variant, obviously Handlers requiring parameters to be passed in would need to be passed in would need to be allocated to the first 32 slots. |
| Note | This instruction will require return stack prediction |

FUNCTION CALLING MECHANISM WITH EMBEDDED INDEX FOR A HANDLER PROGRAM AND AN EMBEDDED IMMEDIATE VALUE FOR PASSING A PARAMETER

BACKGROUND OF THE INVENTION

1. Field of the Invention

This invention relates to the field of data processing systems. More particularly, this invention relates to programmable data processing systems in which an instruction decoder is responsive to program instructions to control processing logic to perform data processing operations specified by the program instructions.

2. Description of the Prior Art

It is known to provide data processing systems including an instruction decoder operable to decode program instructions to control processing logic to perform data processing operations specified by those program instructions. An example of such data processing systems are the processor cores designed by ARM Limited of Cambridge, England. It is known to provide data processing systems in which program instructions of a first instruction set, such as Java bytecodes, are translated to program instructions of a second instruction set, such as an ARM supported program instruction set. This translation may conveniently be provided by a software mechanism such as a just-in-time (JIT) translator or a dynamic adaptive translator. A problem associated with such translators is that the translated code is often considerably larger in size than the original code and thus requires a disadvantageously increased amount of memory storage space. This problem is sometimes referred to as "code bloat".

SUMMARY OF THE INVENTION

Viewed from one aspect the present invention provides apparatus for processing data comprising:

processing logic operable to perform data processing operations; and an instruction decoder operable to decode program instructions to control said processing logic to perform data processing operations specified by said program instructions; wherein said instruction decoder is responsive to a handler branch instruction:

(i) to calculate a handler pointer from a base address stored within a base address register and an index value specified by an index value field within said handler branch instruction;

(ii) to branch to execution of a program instruction of a handler program stored within a memory at location indicated by said handler pointer; and (iii) to store a return address pointing a memory location storing a program instruction to be executed upon a return from said handler program.

The present technique recognises that the provision of a handler branch instruction which allows a handler program to be selected in dependence upon an index field within the handler branch instruction can provide significant improvements in the code density of the translated code, as well as more generally outside of the field of code translation. The handler branch instruction as a single instruction controls the calculation of the address of the branch program based upon the index field, the storage of the return address for use when the handler program has finished and the branch to the handler program.

It will be appreciated that the base address register could be provided in a number of different ways, such as one of the general purpose registers within the standard register file. However, in preferred embodiments, the base address register is provided as a coprocessor configuration register. Typically the base address register for the handler programs holds a static value and so may be conveniently stored within a coprocessor configuration register thereby avoiding the unnecessary consumption of register file registers which can usefully be employed for other purposes.

The handler programs may advantageously be assumed to have a certain fixed maximum size and be as laid out following the base address and accordingly the index value may be subject to a logical left shift before being used to calculate the handler pointer. Thus, the logical left shifting effectively transforms the index value into the address increment between handler programs.

In preferred embodiments the handler pointer is calculated from a sum of values dependent upon the base address and the index value. In more preferred embodiments, the handler pointer is directly provided as the sum of the base address value and a logically left shifted version of the index value.

In many circumstances the utility of the handler branch instruction is improved if it includes an immediate value field thus enabling a parameter to be passed to the handler program. Providing such a mechanism enhances the functionality of the handler programs and enables the use of fewer handler programs to deal with a desired set of processing requirements. The handler programs may, for example, be used to emulate complex instructions and the index value used to pass a parameter associated with such complex instructions to the handler program.

A system may be provided in which a first type of handler branch instruction is provided with an immediate value field and an index value field as well as a second type of handler branch instruction provided with only an index value field. The second type of handler branch instruction is able to dedicate more bit space to the index value field than is the first type of handler branch instruction since the first type of handler branch instruction also needs to provide the immediate value field. Thus, it is convenient that handler programs associated with the first type of handler branch instruction are provided in memory positions close to the handler base address values such that the smaller associated index values may reach them whereas handler programs associated with the second type of handler branch instruction may be provided at positions associated with larger index values of a type which can only be specified within the larger available index value field of the second type of handler branch instruction.

Whilst the handler program may have a variety of different functions, it is particularly well suited to the emulation of one or more program instructions that are non-native instructions not directly decodable by the instruction decoder. This type of situation is one in which a relatively large number of handler programs may be provided to emulate different non-native program instructions and the handler branch instruction with its index value field provides a convenient way of referencing these handler programs using a code dense instruction form.

The mappings between non-native instructions and handler programs can vary and include many-to-one mappings, one-to-one mappings, and one-to-many mappings.

The non-native program instructions may have a variety of different forms, but the present technique is particularly useful when the non-native instructions are machine independent program instructions, such as Java bytecodes, MSIL bytecodes, CIL bytecodes and .NET bytecodes.

As well as use in the emulation of machine independent program instructions the present handler branch instructions may also be used in situations in which the non-native instructions are native program instructions of a different apparatus for processing data. Thus, a particular processor such as an ARM RISC processor may use such instructions during emulation program instructions which are native to a different processor, such as an x86 processor.

It will be appreciated that the handler pointer which is calculated and used by the handler branch instruction could have a wide variety of forms. In some embodiments, the handler pointer could directly represent the start address of the handler program. Alternatively, the handler pointer may be an address to a jump instruction operable to jump execution to a start address of the handler program (e.g. the handler pointer points to a particular jump instruction within a table of jump instructions each corresponding to a different handler program.

Viewed from another aspect the present invention provides a method of processing data with an apparatus for processing data having processing logic operable to perform data processing operations and an instruction decoder operable to decode program instructions to control said processing logic to perform data processing operations specified by said program instructions, said method comprising the steps of:

in response to a handler branch instruction decoded by said instruction decoder controlling said processing logic:

(i) to calculate a handler pointer from a base address stored within a base address register and an index value specified by an index value field within said handler branch instruction;

(ii) to branch to execution of a program instruction of a handler program stored within a memory at location indicated by said handler pointer; and (iii) to store a return address pointing a memory location storing a program instruction to be executed upon a return from said handler program.

Viewed from a further aspect the present invention provides a computer program product including a computer program operable to control an apparatus for processing data having processing logic operable to perform data processing operations and an instruction decoder operable to decode program instructions to control said processing logic to perform data processing operations specified by said program instructions, said computer program comprising:

a handler branch instruction decodable by said instruction decoder to control said processing logic:

(i) to calculate a handler pointer from a base address stored within a base address register and an index value specified by an index value field within said handler branch instruction;

(ii) to branch to execution of a program instruction of a handler program stored within a memory at location indicated by said handler pointer; and (iii) to store a return address pointing a memory location storing a program instruction to be executed upon a return from said handler program.

Viewed from a further aspect the present invention provides a computer program product including a computer program operable to translate non-native program instructions to form native program instructions directly decodable by an apparatus for processing data having processing logic operable to perform data processing operations and an instruction decoder operable to decode program instructions to control said processing logic to perform data processing operations specified by said program instructions, said native program instructions comprising:

a handler branch instruction decodable by said instruction decoder to control said processing logic:

(i) to calculate a handler pointer from a base address stored within a base address register and an index value specified by an index value field within said handler branch instruction;

(ii) to branch to execution of a program instruction of a handler program stored within a memory at location indicated by said handler pointer; and (iii) to store a return address pointing a memory location storing a program instruction to be executed upon a return from said handler program.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
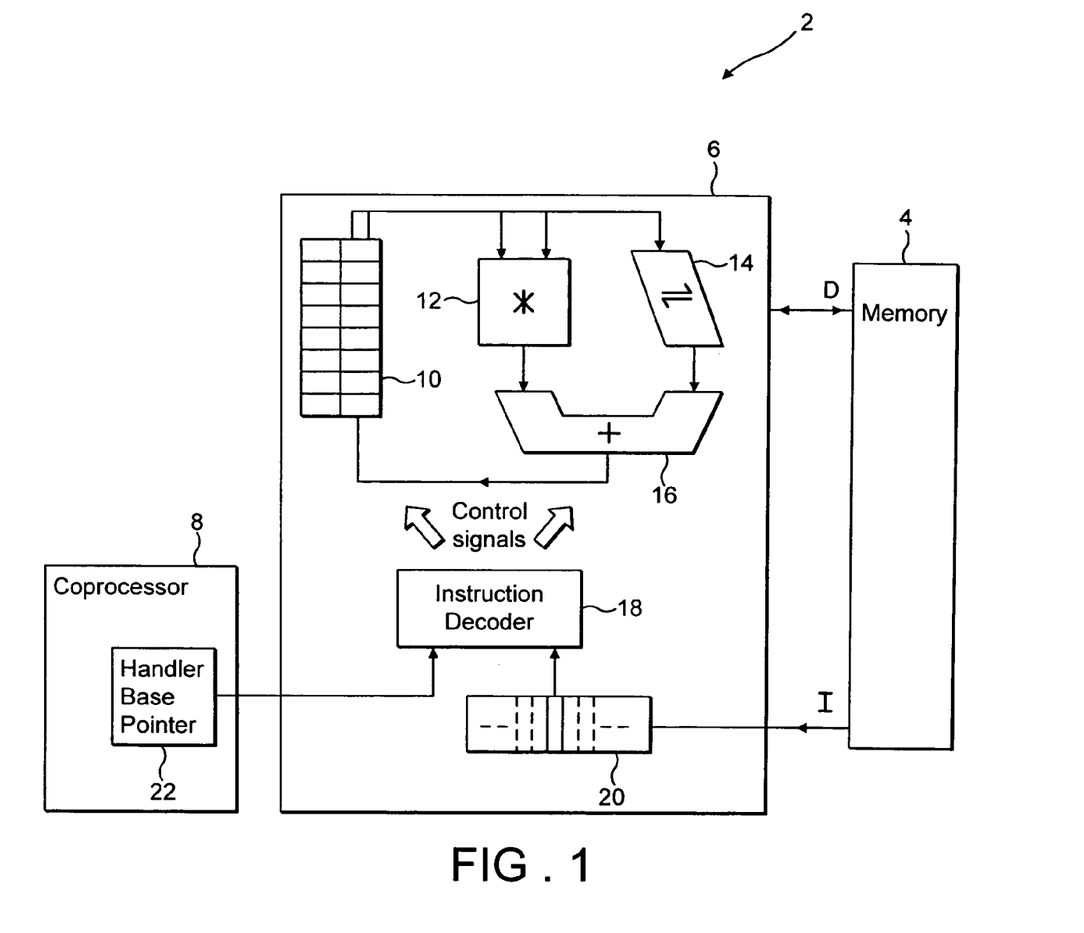
FIG. 1 schematically represents a data processing apparatus using handler branch instructions.

FIG. 1 illustrates a data processing system 2 including a memory 4, a processor 6 and a coprocessor 8. It will be appreciated that the memory 4, the processor 6 and the coprocessor 8 could be provided as separate integrated circuits or could be combined together on a single integrated circuit or some intermediate form in which two of the elements are combined. The processor 6 includes a register file 10, a multiplier 12, a shifter 14 and an adder 16. The register file 10, the multiplier 12, the shifter 14 and the adder 16 together represent processing logic for performing processing operations under control of program instructions which can be considered as being decoded by an instruction decoder 18 when they reach a decode stage of an instruction pipeline 20 (in practice decoding may be spread over several pipeline stages). It will be appreciated that the processing logic may contain further circuits to provide additional and different processing operations. The processor 6 will typically also include many other circuit elements which have not been illustrated in FIG. 1 for the sake of clarity.

The memory 4 stores data and program instructions. Program instructions are fetched into the instruction pipeline 20 and are used by the instruction decoder 18 to generate control signals for controlling the processing logic. In one type of operation, a JIT compiler or a dynamic adaptive compiler executed by the processor 6 and serves to translate a program stored within the memory 4 from a machine independent program instruction language into a native program instruction language (native to the processor 6). As an example, Java bytecodes, MSIL bytecodes, CIL bytecodes or .NET bytecodes may form a program stored within the memory 4 which is translated into native ARM, Thumb or Thumb-2 instructions of the processor 6. The translated program is stored back into the memory 4 for subsequent execution. It will be appreciated that it is important for at least efficiency and cost reasons that the translated program should not consume too much memory storage space.

The coprocessor 8 is a configuration coprocessor containing many configuration registers storing configuration parameters associated with the processor 6. One of these configuration registers is illustrated as a register 22 storing a handler base pointer value. The handler base pointer value is an address location with the memory 4 which is the start of a collection of handler programs which may be called by handler branch instructions decoded by the instruction decoder 18 as will be discussed further hereafter.

Figure 2:
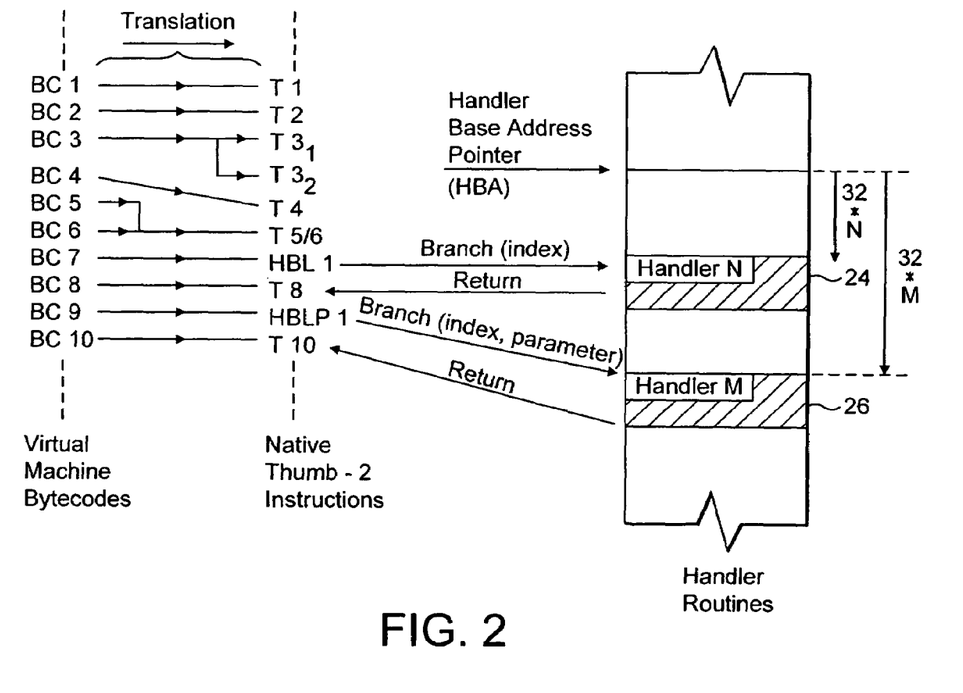
FIG. 2 schematically illustrates the relationship between machine independent bytecodes, a translation of those machine independent bytecodes into native program instructions and branches to handler programs from the native program instructions.

FIG. 2 illustrates a portion of a virtual machine program comprising machine independent program instructions BC1 to BC10. These are subject to a translation by a JIT compiler or a dynamic adaptive compiler to form native Thumb-2 instructions as shown. The translation may be a one-to-one translation, a one-to-many-translation or a many-to-one translation as illustrated.

Certain of the machine independent program instructions to be translated represent complex functions that cannot be readily represented by a few native instructions and can more efficiently be dealt with by handler programs which can then be reused from within the translated program as required. As illustrated, the bytecode BC7 is translated into a handler branch instruction HBL1 which does not include an immediate value field. The handler branch instruction HBL1 does include an index value field which specifies a value N. This indicates that the branch target address upon execution of the handler branch instruction HBL1 is given by the sum of the handler base address pointer HBA and (32*N). The handler program 24 at this address location is Handler N. When that handler program 24 has completed execution, a return instruction at its end causes the link register value stored when the handler branch instruction was executed to be reloaded to the program counter register PC such that processing returns of the native program instruction T8.

The machine independent bytecode BC9 is translated into a different handler branch instruction HBLP1. This second type of handler branch instruction includes an index value field and an immediate value field. The immediate value field can be used to pass a parameter derived from or associated with the bytecode BC9 across to the handler program 26 which is to be called. This allows the handler program 26 to provide an additional degree of functionality in which it is responsive to a parameter passed to it. On completion of the handler program 26, processing is returned to the native program instruction BC10.

Figure 3:
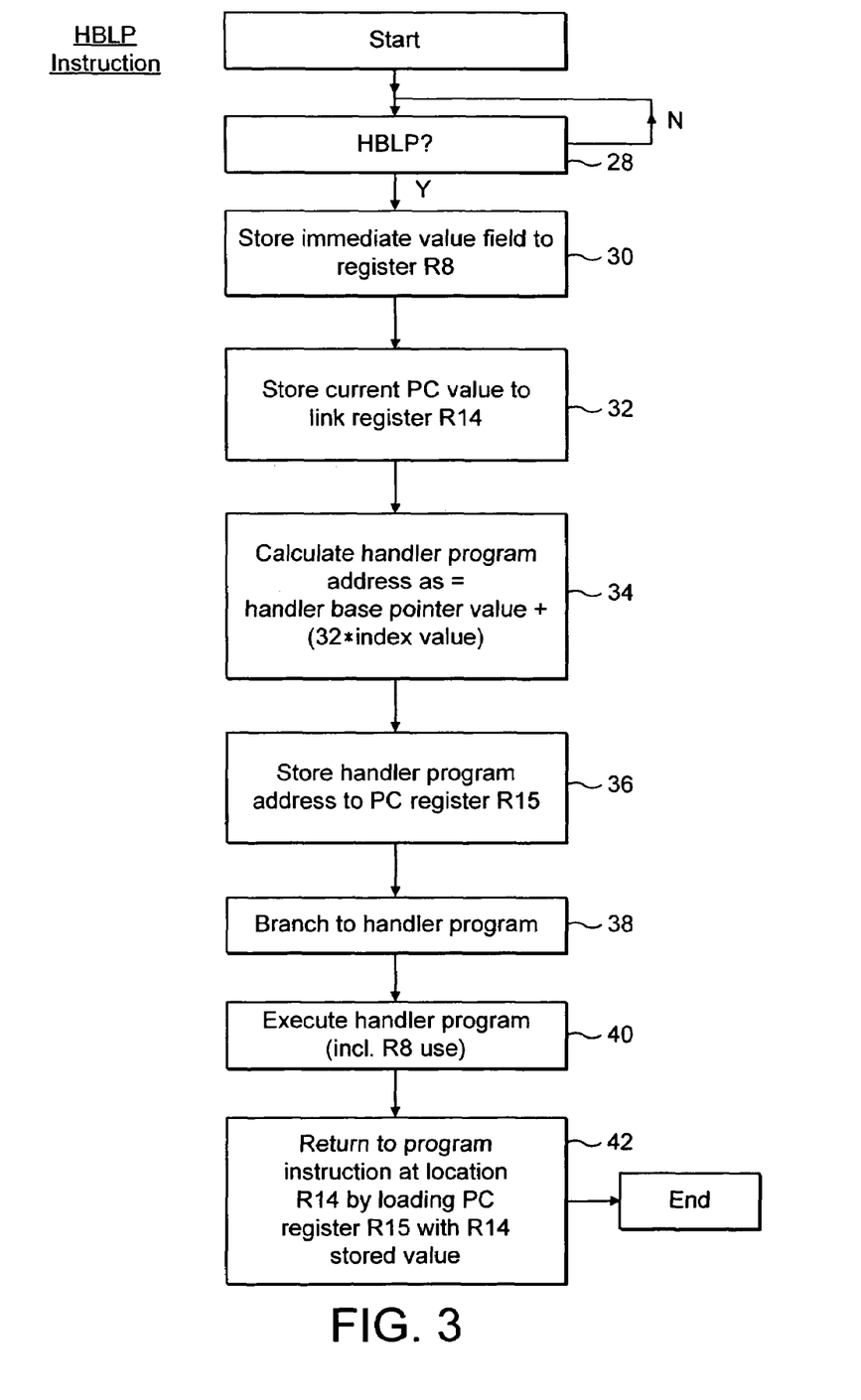
FIG. 3 is a flow diagram schematically illustrating the operations performed by the processing logic following a handler branch instruction including an immediate value field.

FIG. 3 is a flow diagram schematically illustrating the processing operations controlled by the instruction decoder 18 following decoding of a handler branch instruction HBLP which includes an immediate value field. At step 28, the instruction decoder 18 can be considered as waiting until an HBLP instruction is receiving into the decoding stage of the instruction pipeline 20. When such an instruction is recognised, then processing proceeds to step 30 at which the immediate value is stored into register R8 of the register file 10. The handler program assumes that the immediate value associated with the HBLP program will be present within the register R8 when the handler program begins execution.

Step 32 stores the current program counter value PC held, within register R15 of the register file 10 into a link register R14. The return instruction at the end of the handler program assumes that the address value stored within the register R14 is the return address value. It will be appreciated that the return address value normally points to the address following the handler branch instruction which caused the branch to be made.

At step 34, a calculation is made of the branch address as the sum of the handler base pointer value read from the coprocessor configuration register 22 together with a left logical shifted (by 5-bit positions) version of the index value field from within the handler branch instruction HBLP. The calculated handler program address is then stored into the program counter register R15 at step 36 to cause the branch to the handler program at step 38.

Step 40 represents the execution of the handler program, which would normally include some use being made of the immediate value passed to the handler program within the register R8 (it will be appreciated that in some circumstances the handler program may not in fact make use of that immediate value).

At the end of the handler program a return, instruction is reached and step 42 performed whereby a return is made to the instruction following the handler branch instruction by loading into the program counter register R15 the link register value held within register R14. The processing associated with the handler branch instruction is then effectively terminated.

It will be appreciated that in practice the steps 40 and 42 are performed under control of program instructions other than the HBLP being decoded by the instruction decoder 18 rather than directly by the HBLP instruction itself.

Figure 4:
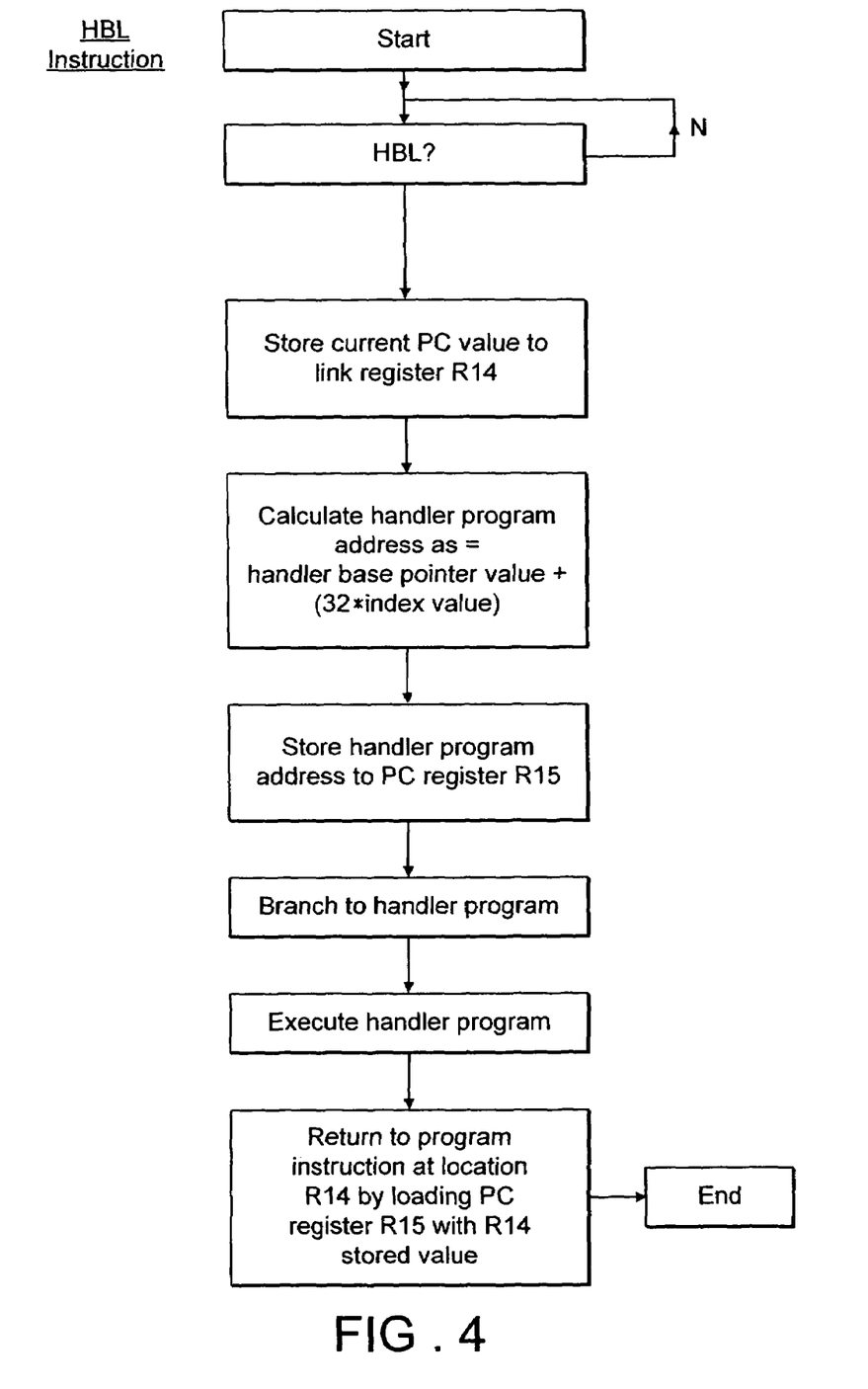
FIG. 4 schematically illustrates the processing operations provided by the processing logic following a handler branch instruction not including an immediate value field.

FIG. 4 illustrates a second type of handler branch instruction HBL. This type of handler branch instruction does not include an immediate value field. This lack of an immediate field allows a larger amount of instruction bit space to be allocated to the index value field and thus provides for a greater range on the handler pointer which can be calculated. For this reason, handler programs associated with handler branch instructions which include an immediate value field are allocated positions within memory close to the handler base address pointer position whereas handler programs which may be associated with the type of handler branch instruction illustrated in FIG. 4 may be positioned further from the handler base address pointer.

The processing steps illustrated in FIG. 4 follow those of FIG. 3 except that there is no storage of an immediate value and the handler program is not able to make reference to an immediate value stored within the predetermined register e.g. R8.

Figure 5:
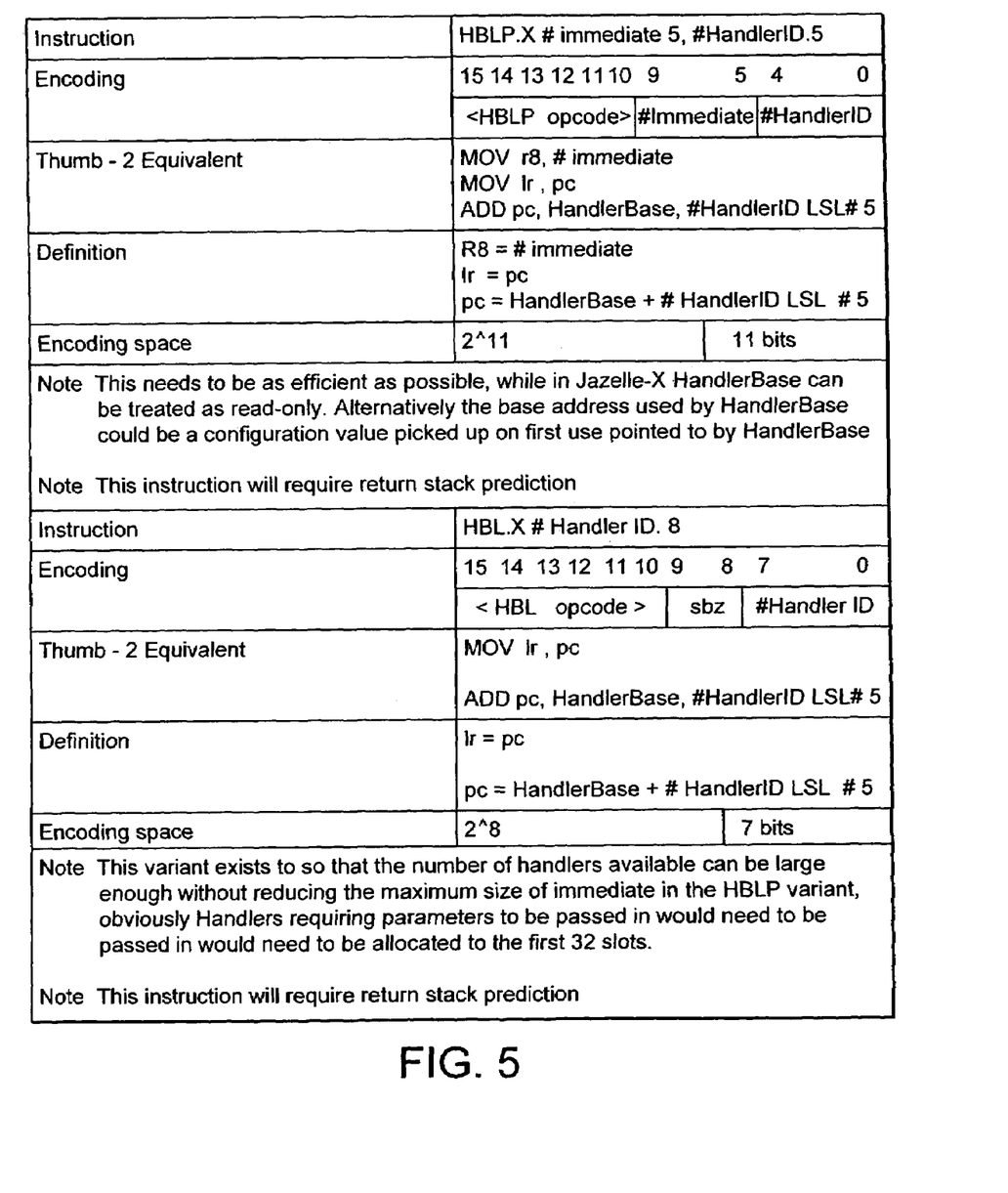
FIG. 5 schematically illustrates the encoding of two types of handler branch instruction.

FIG. 5 schematically illustrates an example encoding of the two types of handler branch instructions illustrated in FIGS. 3 and 4. The syntax used in FIG. 5 is the normal ARM instruction syntax. The functionality illustrated in the portion indicating the Thumb-2 equivalent is a representation of the functions performed by the single associated handler branch instruction. Thus, it will be seen that the handler branch instruction provides a more code dense way of specifying this functionality.

Figure 6:
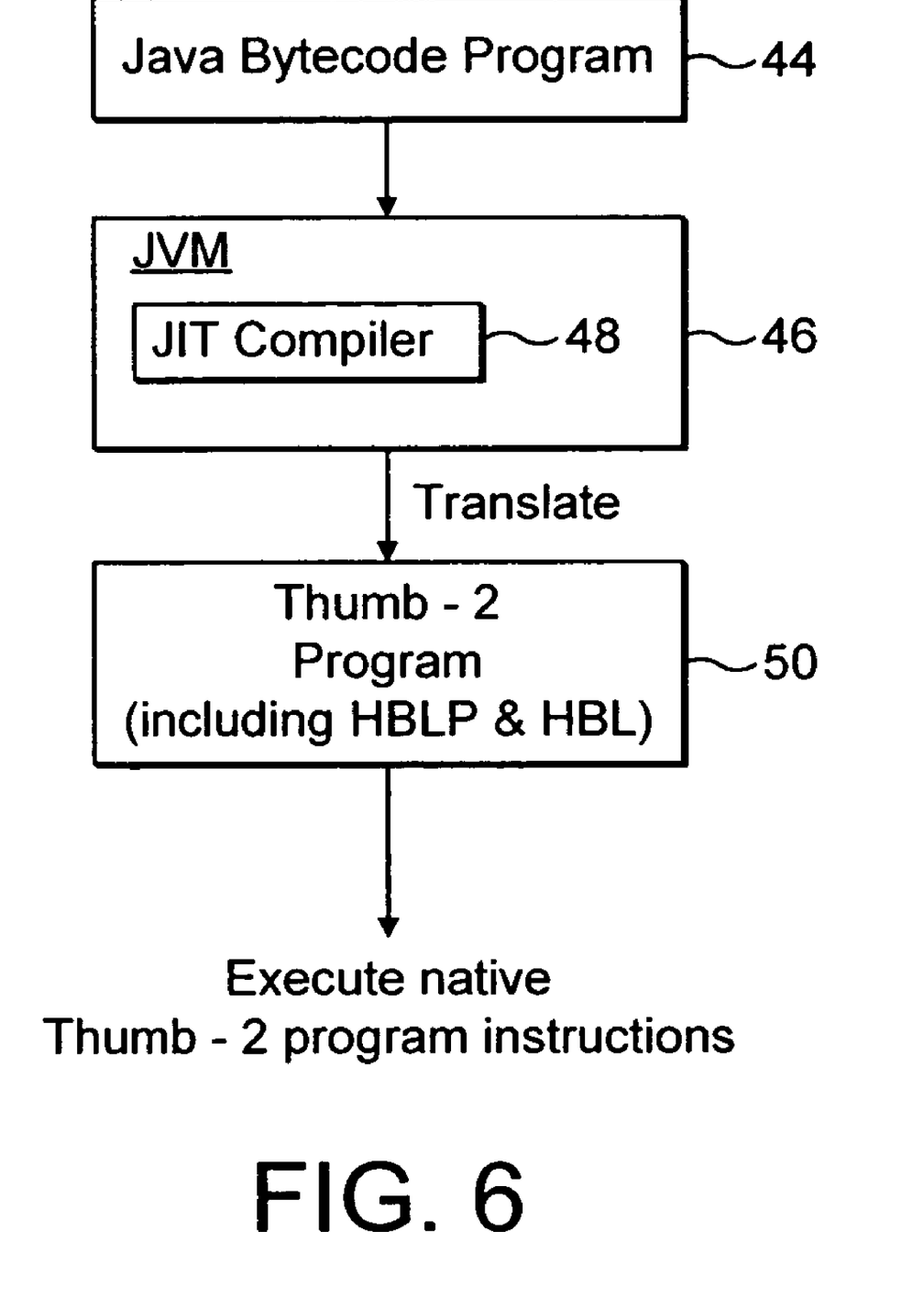
FIG. 6 schematically illustrates the relationship between a machine independent instruction program, a virtual machine program, a translated program and execution of a translated program.

FIG. 6 schematically represents the relationship between a non-native program, a virtual machine, a native program and execution of that native program. As shown, a Java bytecode program 44 is stored within the memory 4 and subject to a translation by a Java virtual machine 46, including a JIT compiler 48, into a native program comprising Thumb-2 instructions 50. It will be appreciated that the JIT compiler 48 may alternatively be a dynamic adaptive compiler. Furthermore, the Java bytecode program 44 could be formed of machine independent program instructions such as MSIL bytecodes, CIL bytecodes, .NET bytecodes etc. In an alternative use, the Java bytecode program 44 could instead be program instructions of another processor, such as a CISC processor (e.g. x86), which are non-native to the processor 6 upon which an execution is desired.

Once the translated program 50 has been formed this will include handler branch instructions HBLP and HBL which are used to call handler programs 24, 26 at appropriate points. These handler programs will be set up and stored at predetermined memory following the handler base address pointer under control of the Java virtual machine 46 and the JIT compiler 48. In the example illustrated, the handler programs are directly provided in the address space following the handler base address pointer HBA. In an alternative embodiment, the handler base address pointer could point to a list of jump instructions which would be selectively branched to in dependence upon the index value field of the handler branch instruction. Those jump instructions would then trigger a jump to a handler program stored in another position. Such an arrangement would more readily allow for handler programs of different sizes to compactly stored within the memory and also for handler programs of widely varying sizes. Alternatively, handler programs of different sizes could be accommodated by incorporating a certain portion of the program at a position following the handler base address pointer and then providing the overflow at a different position which is jumped to by the last instruction within the address space provided following the handler base address pointer for that particular handler program. The return to the native instruction following the handler branch instruction would be moved to the end of the extended portion.

Returning to FIG. 6, the translated program 50 stored within the memory 4 is read from the memory 4 and passed to the instruction pipeline 20 to be decoded by the instruction decoder 18 and used to control the processing logic including the register file 10, the multiplier 12, the shifter 14 and the adder 16. Translated program 50 includes the special handler branch instructions. It will also be appreciated that the translating program in the form of the JIT compiler 48 or a dynamic adaptive compiler serves to generate these new special purpose handler branch instructions within the translated program 50 produced. Thus, the translated program 50 as well as the program which performs that translation 48 are complementary aspects of the present technique.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data comprising:
   processing logic operable to perform data processing operations; and
   an instruction decoder operable to decode program instructions to control said processing logic to perform data processing operations specified by said program instructions; wherein
   said instruction decoder is responsive to a handler branch instruction:
   (i) to calculate a handler pointer from a base address stored within a base address register and an index value specified by an index value field within said handler branch instruction;
   (ii) to branch to execution of a program instruction of a handler program stored within a memory at location indicated by said handler pointer; and
   (iii) to store a return address pointing a memory location storing a program instruction to be executed upon a return from said handler program, wherein said handler branch instruction includes an immediate value field and said instruction decoder is responsive to said handler branch instruction to control said processing logic to store an immediate value stored within said immediate value field into a predetermined register such that said immediate value is accessible to said handler program, wherein said immediate value field is an immediate value field separate from said index value field, wherein said index value is subject to a left logical shift before being used to calculate said handler pointer, said handler pointer being calculated as a sum of the base address and a logically left shifted version of the index value.

2. Apparatus as claimed in claim 1, wherein said base address register is a coprocessor configuration register.

3. Apparatus as claimed in claim 1, wherein said handler pointer is calculated from a sum of values dependent upon said base address and said index value.

4. Apparatus as claimed in claim 1, wherein said instruction decoder is responsive to a first type of handler branch instructions including an index value field of a first length and an immediate value field and a second type of handler branch instruction including an index value field of a second length greater than said first length and not including an immediate value field.

5. Apparatus as claimed in claim 1, wherein said handler program is operable to emulate one or more program instructions that are non-native program instructions that are not directly decodable by said instruction decoder.

6. Apparatus as claimed in claim 5, wherein different forms of non-native program instructions are emulated with different handler programs branched to in response to different index values.

7. Apparatus as claimed in claim 6, wherein one or more of:
   a given form of non-native program instruction is emulated by given handler program;
   a plurality of forms of non-native program instruction are emulated by a given handler program; and
   a given form of non-native program instruction in emulated by one of a plurality of handler programs selected in dependence upon one or more parameters associated with said given form of non-native program instruction.

8. Apparatus as claimed in claim 5, wherein said non-native program instructions are machine independent program instructions.

9. Apparatus as claimed in claim 8, wherein said machine independent program instructions are one of:
   Java bytecodes;
   Microsoft Intermediate Language (MSIL) bytecodes;
   Common Intermediate Language (CIL) bytecodes; and
   .NET bytecodes.

10. Apparatus as claimed in claim 5, wherein said non-native instructions are native program instructions of a different apparatus for processing data.

11. Apparatus as claimed in claim 10, wherein said processing logic and said instruction decoder are part of a RISC processor and said non-native instructions are native instructions of a CISC processor.

12. Apparatus as claimed in claim 1, wherein said handler pointer is a start address of said handler program.

13. Apparatus as claimed in claim 1, wherein said handler pointer is an address of a jump instruction operable to jump execution to a start address of said handler program.

14. A method of processing data with an apparatus for processing data having processing logic operable to perform data processing operations and an instruction decoder operable to decode program instructions to control said processing logic to perform data processing operations specified by said program instructions, said method comprising the steps of:
in response to a handler branch instruction decoded by said instruction decoder controlling said processing logic:
(i) to calculate a handler pointer from a base address stored within a base address register and an index value specified by an index value field within said handler branch instruction;
(ii) to branch to execution of a program instruction of a handler program stored within a memory at location indicated by said handler pointer; and
(iii) to store a return address pointing a memory location storing a program instruction to be executed upon a return from said handler program, wherein said handler branch instruction includes an immediate value field and said instruction decoder is responsive to said handler branch instruction to control said processing logic to store an immediate value stored within said immediate value field into a predetermined register such that said immediate value is accessible to said handler program, wherein said immediate value field is an immediate value field separate from said index value field, wherein said index value is subject to a left logical shift before being used to calculate said handler pointer, said handler pointer being calculated as a sum of the base address and a logically left shifted version of the index value.

15. A method as claimed in claim 14, wherein said base address register is a coprocessor configuration register.

16. A method as claimed in claim 14, wherein said handler pointer is calculated from a sum of values dependent upon said base address and said index value.

17. A method as claimed in claim 14, wherein said instruction decoder is responsive to a first type of handler branch instructions including an index value field of a first length and an immediate value field and a second type of handler branch instruction including an index value field of a second length greater than said first length and not including an immediate value field.

18. A method as claimed in claim 14, wherein said handler program is operable to emulate one or more program instructions that are non-native program instructions that are not directly decodable by said instruction decoder.

19. A method as claimed in claim 18, wherein different forms of non-native program instructions are emulated with different handler programs branched to in response to different index values.

20. A method as claimed in claim 19, wherein one or more of:
a given form of non-native program instruction is emulated by given handler program;
a plurality of forms of non-native program instruction are emulated by a given handler program; and
a given form of non-native program instruction in emulated by one of a plurality of handler programs selected in dependence upon one or more parameters associated with said given form of non-native program instruction.

21. A method as claimed in claim 18, wherein said non-native program instructions are machine independent program instructions.

22. A method as claimed in claim 21, wherein said machine independent program instructions are one of:
Java bytecodes;
Microsoft Intermediate Language (MSIL) bytecodes;
Common Intermediate Language (CIL) bytecodes; and
.NET bytecodes.

23. A method as claimed in claim 18, wherein said non-native instructions are native program instructions of a different apparatus for processing data.

24. A method as claimed in claim 23, wherein said processing logic and said instruction decoder are part of a RISC processor and said non-native instructions are native instructions of a CISC processor.

25. A method as claimed in claim 14, wherein said handler pointer is a start address of said handler program.

26. A method as claimed in claim 14, wherein said handler pointer is an address of a jump instruction operable to jump execution to a start address of said handler program.

27. A computer program product comprising a computer readable storage medium, said product including a computer program operable to control an apparatus for processing data having processing logic operable to perform data processing operations and an instruction decoder operable to decode program instructions to control said processing logic to perform data processing operations specified by said program instructions, said computer program comprising:
a handler branch instruction decodable by said instruction decoder to control said processing logic:
(i) to calculate a handler pointer from a base address stored within a base address register and an index value specified by an index value field within said handler branch instruction;
(ii) to branch to execution of a program instruction of a handler program stored within a memory at location indicated by said handler pointer; and
(iii) to store a return address pointing a memory location storing a program instruction to be executed upon a return from said handler program, wherein said handler branch instruction includes an immediate value field and said instruction decoder is responsive to said handler branch instruction to control said processing logic to store an immediate value stored within said immediate value field into a predetermined register such that said immediate value is accessible to said handler program, wherein said immediate value field is an immediate value field separate from said index value field, wherein said index value is subject to a left logical shift before being used to calculate said handler pointer, said handler pointer being calculated as a sum of the base address and a logically left shifted version of the index value.

28. A computer program product as claimed in claim 27, wherein said base address register is a coprocessor configuration register.

29. A computer program product as claimed in claim 27, wherein said handler pointer is calculated from a sum of values dependent upon said base address and said index value.

30. A computer program product as claimed in claim 27, wherein said instruction decoder is responsive to a first type of handler branch instructions including an index value field of a first length and an immediate value field and a second type of handler branch instruction including an index value field of a second length greater than said first length and not including an immediate value field.

31. A computer program product as claimed in claim 27, wherein said handler program is operable to emulate one or more program instructions that are non-native program instructions that are not directly decodable by said instruction decoder.

32. A computer program product as claimed in claim 31, wherein different forms of non-native program instructions are emulated with different handler programs branched to in response to different index values.

33. A computer program product as claimed in claim 32, wherein one or more of:
a given form of non-native program instruction is emulated by given handler program;
a plurality of forms of non-native program instruction are emulated by a given handler program; and
a given form of non-native program instruction in emulated by one of a plurality of handler programs selected in dependence upon one or more parameters associated with said given form of non-native program instruction.

34. A computer program product as claimed in claim 31, wherein said non-native program instructions are machine independent program instructions.

35. A computer program product as claimed in claim 34, wherein said machine independent program instructions are one of:
Java bytecodes;
Microsoft Intermediate Language (MSIL) bytecodes;
Common Intermediate Language (GIL) bytecodes; and
.NET bytecodes.

36. A computer program product as claimed in claim 31, wherein said non-native instructions are native program instructions of a different apparatus for processing data.

37. A computer program product as claimed in claim 36, wherein said processing logic and said instruction decoder are part of a RISC processor and said non-native instructions are native instructions of a CISC processor.

38. A computer program product as claimed in claim 27, wherein said handler pointer is a start address of said handler program.

39. A computer program product as claimed in claim 27, wherein said handler pointer is an address of a jump instruction operable to jump execution to a start address of said handler program.

40. A computer program product comprising a computer readable storage medium, said product including a computer program operable to translate non-native program instructions to form native program instructions directly decodable by an apparatus for processing data having processing logic operable to perform data processing operations and an instruction decoder operable to decode program instructions to control said processing logic to perform data processing operations specified by said program instructions, said native program instructions comprising:
a handler branch instruction decodable by said instruction decoder to control said processing logic:
(i) to calculate a handler pointer from a base address stored within a base address register and an index value specified by an index value field within said handler branch instruction;
(ii) to branch to execution of a program instruction of a handler program stored within a memory at location indicated by said handler pointer; and
(iii) to store a return address pointing a memory location storing a program instruction to be executed upon a return from said handler program, wherein said handler branch instruction includes an immediate value field separate from said index value field and said instruction decoder is responsive to said handler branch instruction to control said processing logic to store an immediate value stored within said immediate value field into a predetermined register such that said immediate value is accessible to said handler program, wherein said index value is subject to a left logical shift before being used to calculate said handler pointer, said handler pointer being calculated as a sum of the base address and a logically left shifted version of the index value.

41. A computer program product as claimed in claim 40, wherein said base address register is a coprocessor configuration register.

42. A computer program product as claimed in claim 40, wherein said handler pointer is calculated from a sum of values dependent upon said base address and said index value.

43. A computer program product as claimed in claim 40, wherein said instruction decoder is responsive to a first type of handler branch instructions including an index value field of a first length and an immediate value field and a second type of handler branch instruction including an index value field of a second length greater than said first length and not including an immediate value field.

44. A computer program product as claimed in claim 40, wherein said handler program is operable to emulate ones or more program instructions that are non-native program instructions that are not directly decodable by said instruction decoder.

45. A computer program product as claimed in claim 44, wherein different forms of non-native program instructions are emulated with different handler programs branched to in response to different index values.

46. A computer program product as claimed in claim 45, wherein one or more of:
a given form of non-native program instruction is emulated by given handler program;
a plurality of forms of non-native program instruction are emulated by a given handler program; and
a given form of non-native program instruction in emulated by one of a plurality of handler programs selected in dependence upon one or more parameters associated with said given form of non-native program instruction.

47. A computer program product as claimed in claim 44, wherein said non-native program instructions are machine independent program instructions.

48. A computer program product as claimed in claim 47, wherein said machine independent program instructions are one of:
Java bytecodes;
Microsoft Intermediate Language (MSIL) bytecodes;
Common Intermediate Language (GIL) bytecodes; and
.NET bytecodes.

49. A computer program product as claimed in claim 44, wherein said non-native instructions are native program instructions of a different apparatus for processing data.

50. A computer program product as claimed in claim 49, wherein said processing logic and said instruction decoder are part of a RISC processor and said non-native instructions are native instructions of a CISC processor.

51. A computer program product as claimed in claim 40, wherein said handler pointer is a start address of said handler program.

52. A computer program product as claimed in claim 40, wherein said handler pointer is an address of a jump instruction operable to jump execution to a start address of said handler program.

* * * * *